No. 848,577. PATENTED MAR. 26, 1907.
D. STILL.
PORTABLE FEEDER FOR THRESHING MACHINES.
APPLICATION FILED MAR. 20, 1906.

4 SHEETS—SHEET 2.

WITNESSES:

INVENTOR
DAVID STILL
BY
ATTORNEYS

No. 848,577. PATENTED MAR. 26, 1907.
D. STILL.
PORTABLE FEEDER FOR THRESHING MACHINES.
APPLICATION FILED MAR. 20, 1906.

4 SHEETS—SHEET 3.

WITNESSES:
INVENTOR
DAVID STILL
BY
ATTORNEYS

No. 848,577. PATENTED MAR. 26, 1907.
D. STILL.
PORTABLE FEEDER FOR THRESHING MACHINES.
APPLICATION FILED MAR. 20, 1906.

4 SHEETS—SHEET 4.

WITNESSES:

INVENTOR
DAVID STILL
BY
ATTORNEYS

UNITED STATES PATENT OFFICE.

DAVID STILL, OF MILTON, OREGON.

PORTABLE FEEDER FOR THRESHING-MACHINES.

No. 848,577.  Specification of Letters Patent.  Patented March 26, 1907.

Application filed March 20, 1906. Serial No. 307,009.

*To all whom it may concern:*

Be it known that I, DAVID STILL, a citizen of the United States, residing at Milton, in the county of Umatilla and State of Oregon, have invented a new and useful Improvement in Portable Feeders for Threshing-Machines, of which the following is a specification.

My invention is in the nature of a portable feeder for feeding to threshing-machines grain which has been harvested by machines known as "headers"—*i. e.*, grain which has been cut off just below the heads. These heads of grain as cut off by the headers are usually loaded loose into wagon-beds and are unloaded onto the feed-apron by means of nets, or if the grain has been cut and stacked derrick-forks are employed to transfer it to the feed-apron.

My invention comprises a portable wagon-like body mounted on wheels for transportation, provided with longitudinal and transverse feed-aprons and picking and feeding devices, whereby the grain is fed to an elevator leading to the feed-table of the thresher, the wagon-body being also provided with a derrick to facilitate the loading of the grain into the same and the feed-aprons of the device being connected by a suitable power-transmission shaft and universal joint to the power mechanism of the thresher.

By my invention much heavy work of distributing the grain in the elevator is avoided, the grain is fed fast or slow, as may be desired, and a great economy of time and labor is secured.

Figure 1:
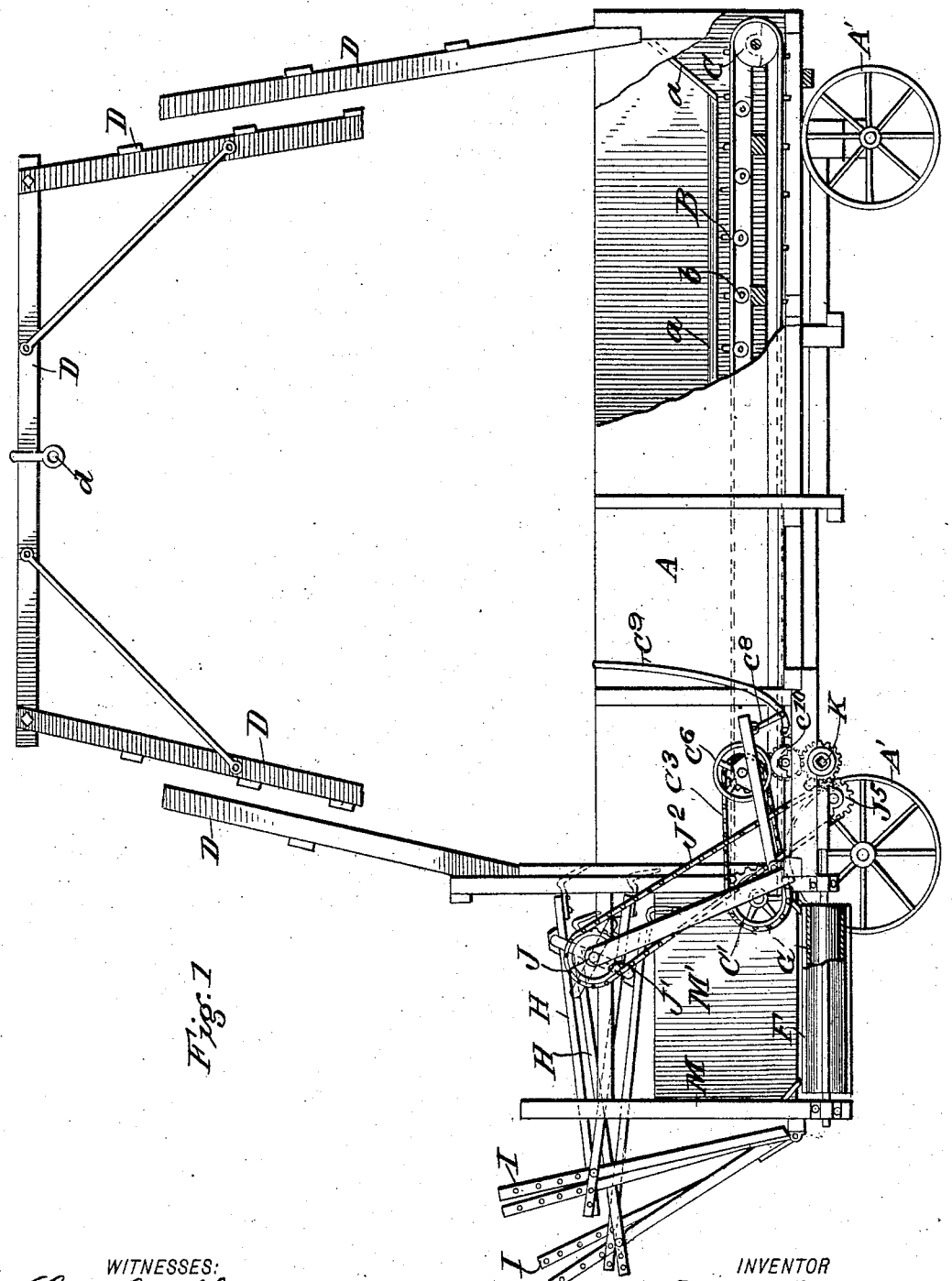
Figure 2:
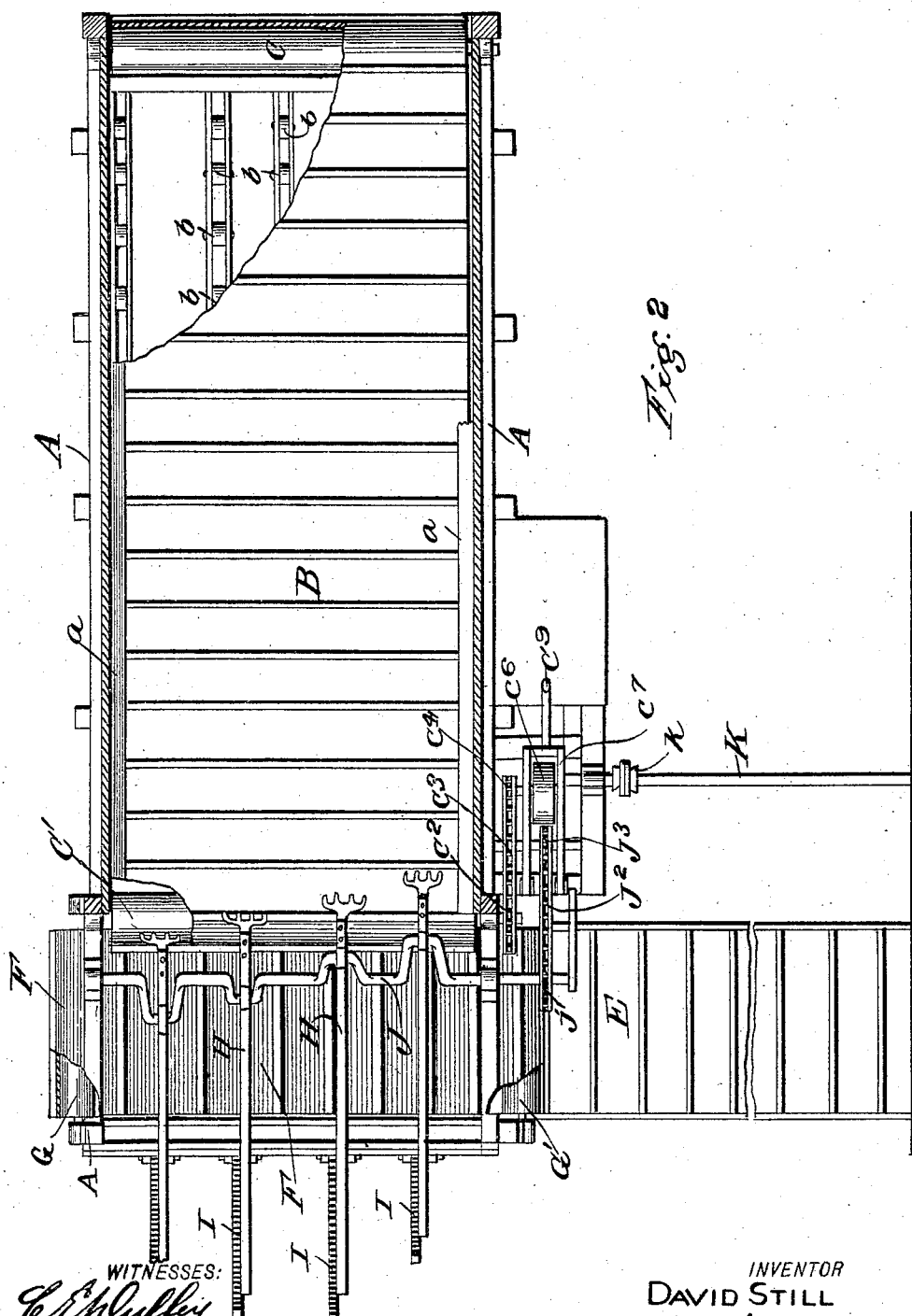
Figure 3:
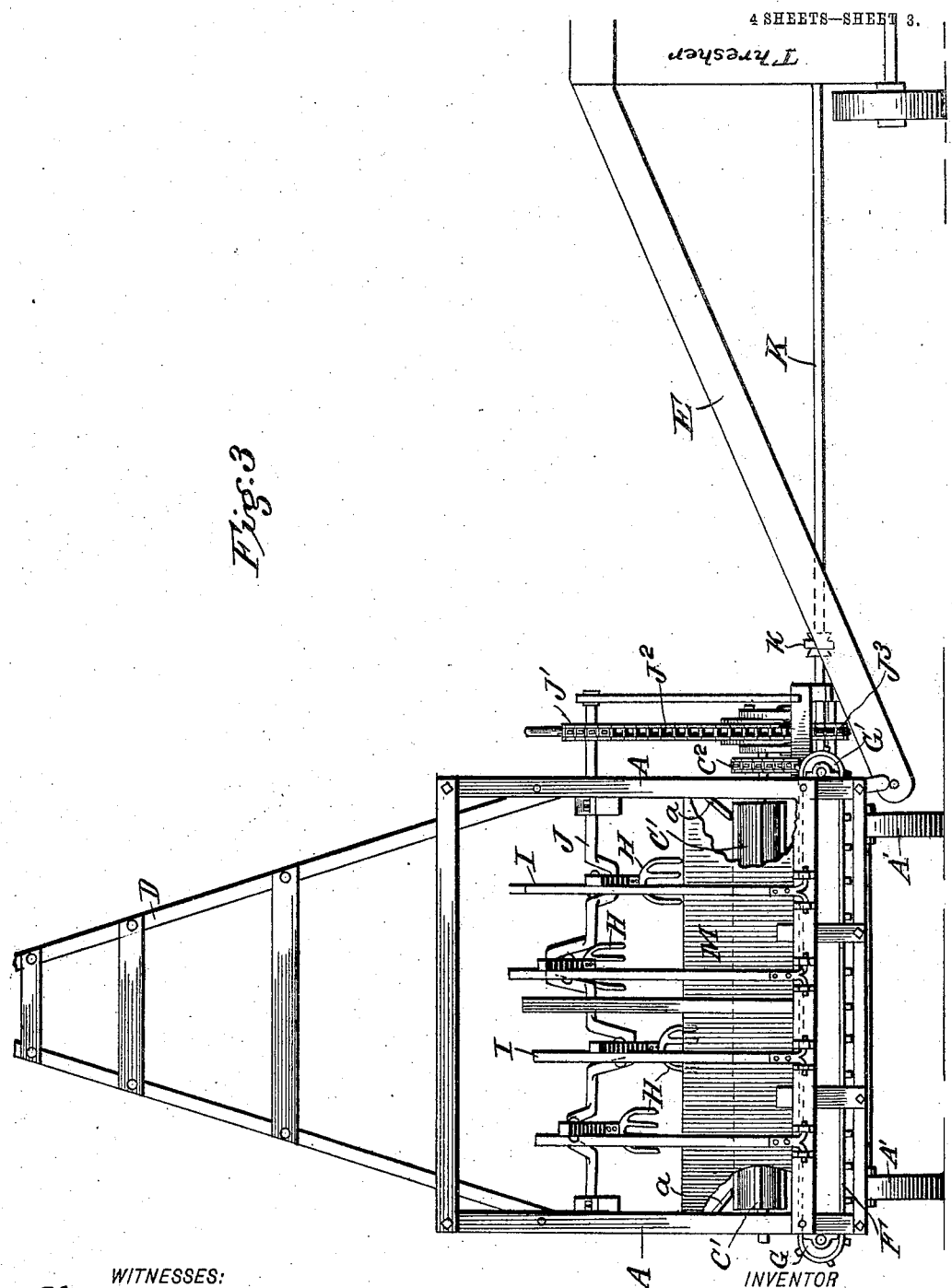
Figure 4:
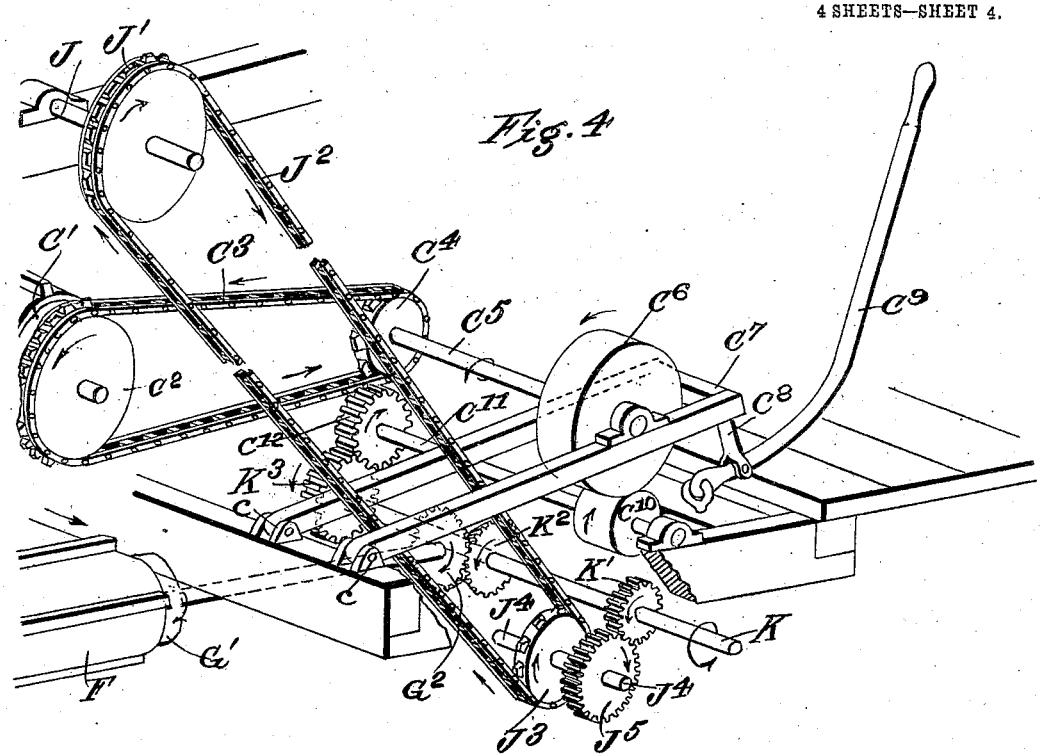

Figure 1 is a side elevation of my portable feeder with parts broken away. Fig. 2 is a plan view with parts broken away and showing the feeder juxtaposed to the thresher and connected up with the same by the power-transmission shaft and the elevator. Fig. 3 is an end elevation taken from the left-hand end of Fig. 2. Fig. 4 is a perspective view of the transmission-gears.

In the drawings, Fig. 1, A represents a wagon-like body having two high side-boards and one closed end. The closed end is shown on the right of Fig. 1, the other end being open for the purpose hereafter described. This wagon-body is mounted upon wheels A' to permit it to be transported in the field along with the thresher.

The bottom of the wagon-body is formed of an endless slatted apron B, traveling around transverse rollers C C', located at opposite ends of the wagon. The upper run of this slatted apron is sustained upon and travels over small rollers b, so that it is able to sustain considerable weight without sagging down.

At the open end of the wagon-body the main longitudinal apron B discharges onto a smaller transverse apron F at a somewhat lower level, and this transverse apron F discharges into the lower end of an elevator E, (see Figs. 2 and 3,) which leads up to and discharges onto the feed-table of the thresher.

Mounted on the wagon-body is a detachable and folding derrick-frame D, which has on its horizontal bar at the top a supporting eye or hook d for a sling or block and tackle, by which the receptacle containing the grain-heads is raised and the grain dumped into the wagon-body and on the traveling and slatted apron, whose motion gradually feeds the grain onto the elevator, the movement being regulated and under control, as hereafter described.

As the wheat or other grain is discharged from the longitudinal apron B to the transverse apron F it is stirred and distributed uniformly by pickers H. These pickers consist of long bars arranged longitudinally with the wagon and having on one end bent tines, like a rake or potato-hoe, which project a short distance into the wagon and rake out the grain from the longitudinal apron onto the transverse apron. These pickers are at their inner ends loosely mounted upon the bent portions of a multiple crank-shaft J, whose rotation imparts to the pickers the necessary movement.

On the outer side of the transverse apron there are a rear wall M and a side wall M', which hold the grain onto the transverse apron. Outside the rear wall M and near its bottom there are pivoted a number of upright tilting bars I, which at their upper ends are pivoted to the outer ends of the picker-bars H, the connection being made adjustable by a series of holes in the tops of the tilting bars and a detachable pivot-bolt for each. As the crank-axle J rotates the front end of the pickers are also given a rotary raking movement, the tilting bars I moving back and forth on their lower pivots to accommodate such movement. By raising or lowering the connection of the picker-bars H with tilting bars I the rake end of the pickers is made to approach more or less closely to the traveling apron B.

The transverse apron F is distended about two rollers G G' and is rotated through the roller G'.

I will now describe the means for driving the various parts of my feeder.

K, Figs. 2 and 3, is a transmission-shaft, which connects with a jack or some other power connection of the thresher. This shaft to avoid the necessity for accurate alinement is provided with any suitable form of universal joint $k$.

Referring now to Fig. 4, the transmission-shaft K near the wagon-feeder is provided with three rigidly-attached gear-wheels. The middle gear $K^2$ is a bevel-gear and meshes with a bevel-gear $G^2$ on the prolonged end of the shaft of roller G', which latter drives the transverse apron F. An outer gear K' on the transmission-shaft meshes with a gear-wheel $J^5$ on a shaft $J^4$, which shaft has a rigid sprocket-wheel $J^3$, and this sprocket-wheel is connected by a chain belt $J^2$ to a sprocket-wheel J' on the crank-shaft J. This connection drives the multiple crank-shaft which operates the pickers. An inner gear $K^3$ on the transmission-shaft K meshes with a gear $C^{12}$ on a shaft $C^{11}$, and this shaft $C^{11}$ has a small friction-pulley $C^{10}$, on top of which at the will of the operator there rests a larger friction-pulley $C^6$. This friction-pulley is carried in bearings in a yoke-shaped frame $C^7$, whose two legs are pivoted at $c$ to the main frame of the machine. The shaft $C^5$ of the pulley $C^6$ is provided with a rigidly-attached sprocket-wheel $C^4$, which through chain belt $C^3$ is connected with a sprocket-wheel $C^2$, fixed to the shaft of one of the main-apron rollers C'. This connection drives the main apron in the bottom of the wagon; but it may be interrupted at will, as follows: A hand-lever $C^9$ is pivoted at its end to an eye-bolt or other connection in the main frame, and a link $C^8$ connects the hand-lever $C^9$ to the adjustable frame $C^7$ of pulley $C^6$. To stop or start the main apron B in the wagon-body, it is only necessary to raise or lower the pulley $C^6$ out from or into contact with the subjacent pulley $C^{10}$. When the pulley $C^6$ is raised, the transmission of power to the main apron B is interrupted, and when pulley $C^6$ is lowered the apron B is again started into motion. This is an important feature of advantage, since as the grain is dumped onto the main apron B in more or less irregular lots it is necessary to have the discharge of the grain from the main apron B onto the cross-apron F under perfect control, so that if there should be any tendency of the pickers on the elevator to become clogged the movement of the main apron may be instantly stopped until the congestion is relieved and the main apron started again whenever the circumstances justify it. It will be understood that while the main apron is thus stopped the pickers and transverse apron still continue in action.

To prevent the grain from passing down at the edges of the apron, an inclined overhanging guard $a$ is fixed to the side walls and overhangs the edges of the apron.

Having thus described my invention, what I claim as new, and desire to secure by Letters Patent, is—

1. A portable feeder for threshing-machines, comprising a wagon-like body having a slatted and endless longitudinal apron in its bottom, a transverse apron at the end thereof at a lower level, an external power-transmission shaft, driving-gears for connecting the same to the two aprons and means for interrupting the transmission of power to the longitudinal apron without affecting the movement of the other.

2. A portable feeder for threshing-machines, comprising a wagon-like body having a slatted and endless longitudinal apron in its bottom, a transverse apron at the end thereof at a lower level, a series of pickers arranged at the discharge end of the longitudinal apron, an external power-transmission shaft, and means for interrupting the transmission of power to the longitudinal apron without affecting the movement of the transverse apron and the pickers.

3. A portable feeder for threshing-machines, comprising a wagon-like body having a traveling longitudinal apron in its bottom, a transverse apron at the end thereof at a lower level, an upright inclosure for one end and one side of said transverse apron, an external power-transmission shaft and gears connecting the same to the aprons.

4. A portable feeder for threshing-machines, comprising a wagon-like body having a traveling longitudinal apron in its bottom, a transverse apron at the end thereof at a lower level, a transverse crank-shaft, picker-bars hung thereon at one end, upright tilting bars pivoted at their lower ends and connected at their upper ends to the picker-bars, an external power-transmission shaft and gears for connecting the same to the aprons and picker-shaft.

5. A portable feeder for threshing-machines, comprising a wagon-like body having a traveling longitudinal apron in its bottom, a transverse apron at the end thereof and at a lower level, a transverse crank-shaft with pickers, an external power-transmission shaft, a pair of bevel-gears connecting the same to the shaft of the transverse apron, a pair of gears with sprocket wheels and chains connecting it with the picker-shaft and a separable friction-gear with operating-lever and sprocket wheels and chain for connecting it to the main longitudinal apron.

6. A thresher-feeder comprising a set of supporting-wheels, a longitudinally-arranged endless apron, a transversely-arranged endless apron at the rear end and picking devices.

7. A thresher-feeder comprising a set of supporting-wheels, a longitudinally-arranged endless apron, a transversely-arranged endless apron at the rear end, picking devices, means for driving said parts, and means for stopping the longitudinally-arranged apron while the other parts are operating.

DAVID STILL.

Witnesses:
J. S. ELAM,
JOHN R. MOODY.